(12) United States Patent
Lin et al.

(10) Patent No.: US 8,491,173 B2
(45) Date of Patent: Jul. 23, 2013

(54) LIGHT SOURCE MODULE AND ILLUMINATION APPARATUS

(75) Inventors: Sheng-Hung Lin, Hsin-Chu (TW); Chih-Ming Hu, Hsin-Chu (TW); Jung-Min Hwang, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 0 days.

(21) Appl. No.: 13/295,103

(22) Filed: Nov. 14, 2011

(65) Prior Publication Data
US 2012/0127754 A1 May 24, 2012

(30) Foreign Application Priority Data
Nov. 18, 2010 (TW) ................................ 99139735 A

(51) Int. Cl.
*F21V 33/00* (2006.01)

(52) U.S. Cl.
USPC ........... 362/608; 362/610; 362/612; 362/616; 362/97.3

(58) Field of Classification Search
USPC ................ 362/97.3, 606–610, 612, 613, 616, 362/311.02
See application file for complete search history.

(56) References Cited

U.S. PATENT DOCUMENTS

| | | | |
|---|---|---|---|
| 6,874,900 B2 * | 4/2005 | Hsieh | 362/26 |
| 7,566,148 B2 * | 7/2009 | Noh et al. | 362/305 |
| 7,637,647 B2 * | 12/2009 | Chen | 362/613 |
| 7,791,683 B2 * | 9/2010 | Larson et al. | 349/62 |
| 2008/0106902 A1 * | 5/2008 | Peng et al. | 362/299 |
| 2010/0195315 A1 * | 8/2010 | Ohkawa | 362/97.1 |

FOREIGN PATENT DOCUMENTS

| | | |
|---|---|---|
| JP | 04-55002 | 5/1992 |
| JP | 10-107958 | 4/1998 |
| JP | 2002-298629 | 10/2002 |
| JP | 2003-332629 | 11/2003 |
| JP | 2007-227095 | 9/2007 |

(Continued)

OTHER PUBLICATIONS

"Office Action of Japan Counterpart Application", issued on Mar. 5, 2013, with English translation thereof, p1-p4, in which the listed references (Ref.1-5) were cited.
"Office Action of Taiwan Counterpart Application", issued on Mar. 25, 2013, p1-p8, in which the listed reference (Ref.6) was cited.

*Primary Examiner* — Laura Tso
(74) *Attorney, Agent, or Firm* — Jianq Chyun IP Office

(57) ABSTRACT

A light source module includes a transparent element, a plurality of light-emitting devices, and a plurality of light diffusion micro-structures. The transparent element includes a transparent substrate having a light exiting surface and a bottom surface opposite to the light exiting surface, a plurality of first notches, and a plurality of second notches. The first notches are sunken at the light exiting surface. There is a reflection surface in each of the first notches. The second notches are respectively opposite to the first notches and sunken at the bottom surface. The second notches respectively have a light incident curve-surface. The light-emitting devices are respectively disposed beside the light incident curve-surfaces. Each of the light-emitting devices has a light exiting surface capable of providing a light beam. The light exiting surface is not conformal to the light incident curve-surface. The light diffusion micro-structures are disposed on the bottom surface.

18 Claims, 11 Drawing Sheets

FOREIGN PATENT DOCUMENTS

| | | |
|---|---|---|
| TW | 200305291 | 10/2003 |
| TW | 594072 | 6/2004 |
| TW | I266120 | 11/2006 |
| TW | I285286 | 8/2007 |
| TW | M329738 | 4/2008 |
| TW | M331679 | 5/2008 |

* cited by examiner

LIGHT SOURCE MODULE AND ILLUMINATION APPARATUS

CROSS-REFERENCE TO RELATED APPLICATION

This application claims the priority benefit of Taiwan application serial no. 99139735, filed on Nov. 18, 2010. The entirety of the above-mentioned patent application is hereby incorporated by reference herein and made a part of this specification.

BACKGROUND OF THE INVENTION

1. Field of the Invention

The invention generally relates to a light source module, and more particularly, to an illumination apparatus using the light source module.

2. Description of Related Art

In a side-type backlight module employing light emitting diodes (LEDs) as the light-emitting devices thereof, a plurality of LEDs arranged in a line with an interval are disposed beside a light incident surface at a side of a light guide plate (LGP) thereof. Light beams provided by the LEDs enter the LGP through the light incident surface of the LGP. The light beam of the LEDs has higher directionality, i.e., each of the LEDs has a specific light exiting angle range, so that a bright region is formed in an area of the LGP, wherein the area is close to the LED and falls in the light exiting angle range of the LED, while meantime, a dark region is formed in another area out of the light exiting angle range. The bright regions and the dark regions make the planar light source provided by the LGP ununiform to produce so-called hot spot phenomena. In order to reduce the influence of the hot spot phenomena, an area from the light incident side of the LGP to a place far away from the light incident side is used as a light-blending area for the light beams of the LEDs after entering the LGP. As a result, the area of the light exiting surface of the LGP able to provide an effective planar light source is reduced.

Although an increased quantity of the LEDs is able to effectively reduce the hot spot phenomena and shorten the distance of the light-blending area, however, increasing the quantity of the LEDs would increase the cost and the overall temperature leading to a shorter LED lifetime. In general speaking, when the ratio (A/P) of the light-blending distance of the light-blending area (A) over the interval between two adjacent light-emitting devices (P) gets less, the hot spot phenomena get more unnoticeable. According to the design currently, the ratio (A/P) of the light-blending distance of the light-blending area (A) over the interval between two adjacent light-emitting devices (P) is about 1.7, no way to make A/P less.

U.S. Pat. No. 6,874,900 discloses a direct-type backlight module, wherein the backlight module includes an LGP and a plurality of LED light sources. The LGP further includes a plurality of dents and a plurality of concave portions, wherein the dents are for accommodating the LED light sources and each dent includes a horizontal surface, a turncate conic surface, and a vertical wall.

Taiwan Patent No. I285286 discloses a direct-type backlight module, and the direct-type backlight module includes an LGP and an LED light source. The LGP therein further includes an insertion portion and a conic concave portions, wherein the LED light source is disposed in the insertion portion, and the tangent slopes of the light exiting area of the LED light source are similar to the corresponding tangent slopes of the insertion portion, i.e., the shape of the LED light exiting area is conformed to the insertion portion. By using the design, the light beam from the light exiting area of the LED light source after being transmitted to the insertion portion would be directly and perpendicularly incident on the insertion portion, and the light beam would be directly transmitted to the light exiting surface, not be refracted with a larger angle to enter the LGP and not be continuously transmitted. As a result, the light intensity near to the insertion portion and the conic concave portions would be more concentrative, which makes the light intensity distribution in the LGP more ununiform.

Taiwan Patent No. M331679 discloses a side-type backlight module, and the side-type backlight module includes an LGP and a light source module, wherein a light-emitting area of the light source module covers a light incident surface of the LGP. In addition, the light source module includes a plurality of LEDs, two correction bodies, and a reflective plate, wherein the two correction bodies respectively have a light-guiding surface, a light exiting surface, and a reflection surface, and the two correction bodies are disposed in leaning against each other.

SUMMARY OF THE INVENTION

Accordingly, the invention is directed to a light source module able to provide a line light source or a planar light source with better light uniformity.

The invention is also directed to an illumination apparatus employing the above-mentioned light source module to have the same advantage.

Other objectives and advantages of the invention will be further understood from the further technological features disclosed by the embodiments of the invention.

To achieve one of, a part of or all of the above-mentioned advantages, or to achieve other advantages, an embodiment of the invention provides a light source module, and the light source module includes a transparent element, a plurality of light-emitting devices, and a plurality of light diffusion micro-structures. The transparent element includes a transparent substrate, a plurality of first notches, and a plurality of second notches. The transparent substrate has a light exiting surface and a bottom surface opposite to the light exiting surface. The first notches are sunken at the light exiting surface and respectively have a reflection surface therein, wherein the reflection surface connects the light exiting surface. The second notches are respectively opposite to the first notches and sunken at the bottom surface, and the second notches respectively have a light incident curve-surface, wherein the light incident curve-surface connects the bottom surface. The light-emitting devices are respectively disposed beside the light incident curve-surface of each of the second notches, and each of the light-emitting devices has a light exiting surface capable of providing a light beam, wherein the light exiting surface of each the light-emitting device is not conformed respectively to the light incident curve-surface of each the corresponding second notch. The light diffusion micro-structures are disposed on the bottom surface of the transparent substrate.

In an embodiment of the invention, the light beam from each of the light-emitting devices is capable of passing through the light incident curve-surface of each of the second notches to enter the transparent substrate, and a portion of the light beam passing through the light incident curve-surface is transmitted to the reflection surface and then gets at least partial total internal reflection by the reflection surface.

In an embodiment of the invention, each of the first notches has a cavity bottom surface connecting the reflection surface, and the partial light beam from each of the light-emitting devices is capable of respectively passing through the light incident curve-surface of the corresponding second notch to enter the transparent substrate and pass through the cavity bottom surface of the corresponding first notch to exit out of the transparent substrate.

In an embodiment of the invention, each of the light-emitting devices includes a substrate, an LED chip, and an encapsulant. The LED chip is disposed on the substrate and has a light-emitting surface, and the light-emitting surface is capable of providing the light beam. The encapsulant is disposed on the LED chip, and a surface of the encapsulant comprises the light exiting surface of the corresponding light-emitting device. In an embodiment of the invention, the above-mentioned surface includes a plane surface or a curve-surface.

In an embodiment of the invention, the transparent element further includes a plurality of openings, and the openings are respectively communicated with the first notches and the corresponding second notches. In an embodiment of the invention, the reflection surface connects the light incident curve-surface.

In an embodiment of the invention, the transparent substrate further has a side surface, wherein the side surface connects the light exiting surface and the bottom surface of the transparent substrate. In an embodiment of the invention, the side surface is perpendicular to the light exiting surface and the bottom surface of the transparent substrate. In another embodiment of the invention, the side surface is inclined to the light exiting surface and the bottom surface of the transparent substrate, and when the partial light beam in the transparent substrate is transmitted to the side surface, the light beam is reflected by the side surface to exit out of the light exiting surface of the transparent substrate.

In an embodiment of the invention, the light diffusion micro-structures include a plurality of net points or a plurality of sunken micro-structures.

In an embodiment of the invention, the light source module further includes a first reflective plate disposed at the bottom surface of the transparent substrate and located at the peripherals of the light-emitting devices.

An embodiment of the invention further provides another illumination apparatus, and the illumination apparatus includes the above-mentioned light source module and an LGP. The LGP has a light incident surface, a light exiting surface, and a bottom surface, wherein the light exiting surface of the LGP is opposite to the bottom surface of the LGP, the light incident surface connects the light exiting surface of the LGP and the bottom surface of the LGP, the light source module is disposed beside the light incident surface of the LGP and the light exiting surface of the transparent substrate faces the light incident surface of the LGP.

In an embodiment of the invention, the illumination apparatus further includes an optical film assembly disposed on the light exiting surface of the LGP, wherein the optical film assembly includes at least one of diffusion sheet, prism sheet, and brightness-enhancing sheet.

In an embodiment of the invention, the illumination apparatus further includes a second reflective plate disposed at the bottom surface of the LGP.

In an embodiment of the invention, the transparent element is a bar-like transparent substrate.

In an embodiment of the invention, the first notches and the second notches are arranged in the one-dimension.

An embodiment of the invention further provides yet another illumination apparatus, and the illumination apparatus includes the light source module and an optical film assembly, wherein the optical film assembly is disposed on the light exiting surface of the transparent element, and the optical film assembly includes at least one of diffusion sheet, brightness-enhancing sheet, and prism sheet.

In an embodiment of the invention, the transparent element is a flat-type transparent element.

In an embodiment of the invention, the first notches and the second notches are arranged in the two-dimensions on the transparent substrate.

Based on the depiction above, the embodiment of the invention may have at least one of the advantages. The light source module of the embodiment of the invention combines the light-emitting devices of point light sources with the transparent element, wherein the light exiting surface of the light-emitting device is not conformed to the light incident curve-surface of the transparent element, i.e., the tangent slopes of the light exiting surface of the light-emitting device are different from the tangent slopes of the corresponding light incident curve-surface of the transparent element so as to provide a line light source or a planar light source with better light uniformity. In addition, by means of combining the LGP with the light source module providing the line light source, the illumination apparatus is also advantageous in reducing the quantity of the light-emitting devices, reducing the cost and reducing the chance of producing the hot spot phenomena, so that the embodiment of the invention is able to provide an illumination planar light source with better light uniformity. Similarly, by means of combining the optical film assembly with the light source module providing the planar light source, the illumination apparatus is also advantageous in reducing the quantity of the light-emitting devices and providing an illumination planar light source with better light uniformity.

Other objectives, features and advantages of the invention will be further understood from the further technological features disclosed by the embodiments of the invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to." Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
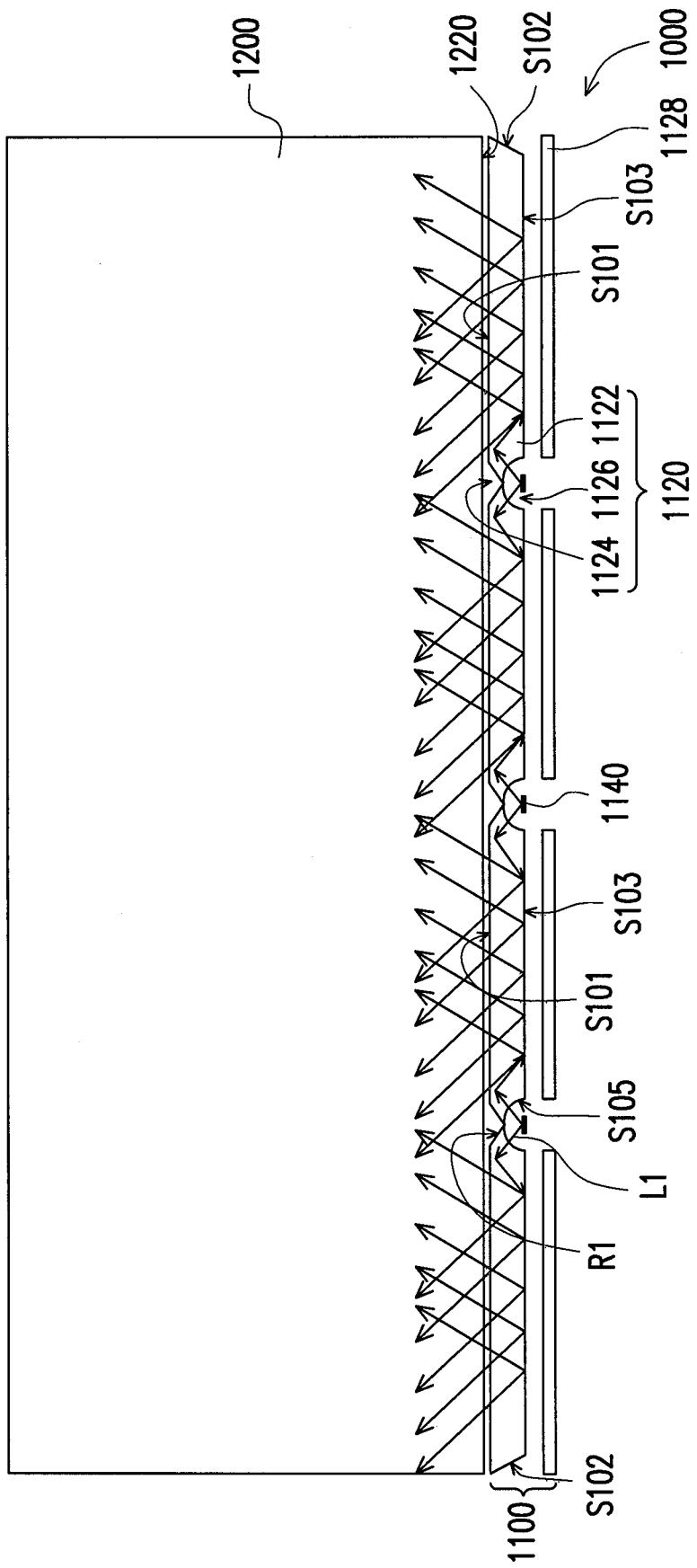
FIG. 1A is a top-view diagram of an illumination apparatus according to an embodiment of the invention.
Figure 1B:
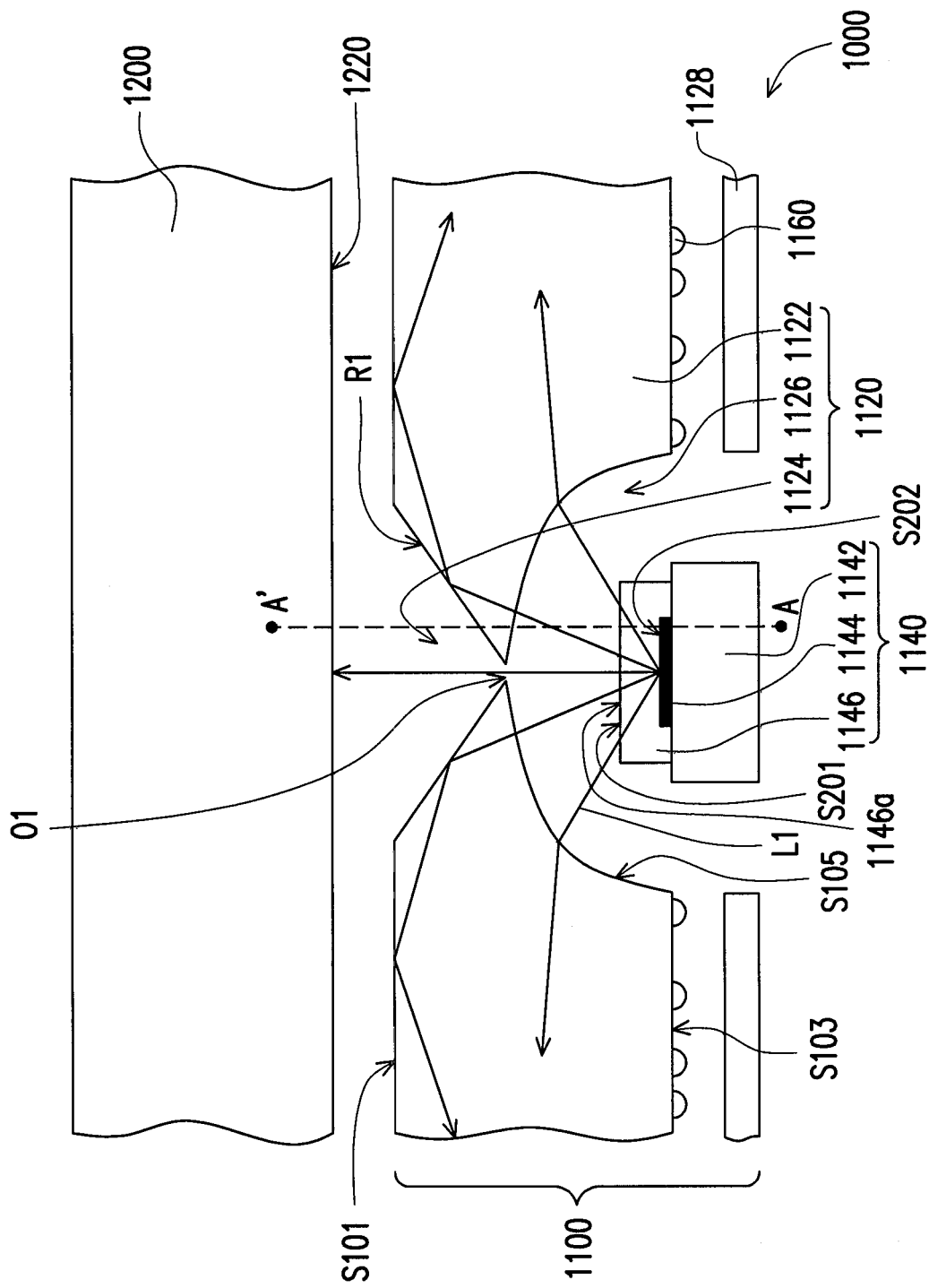
FIG. 1B is a locally enlarged diagram of the illumination apparatus of FIG. 1A.
Figure 1C:
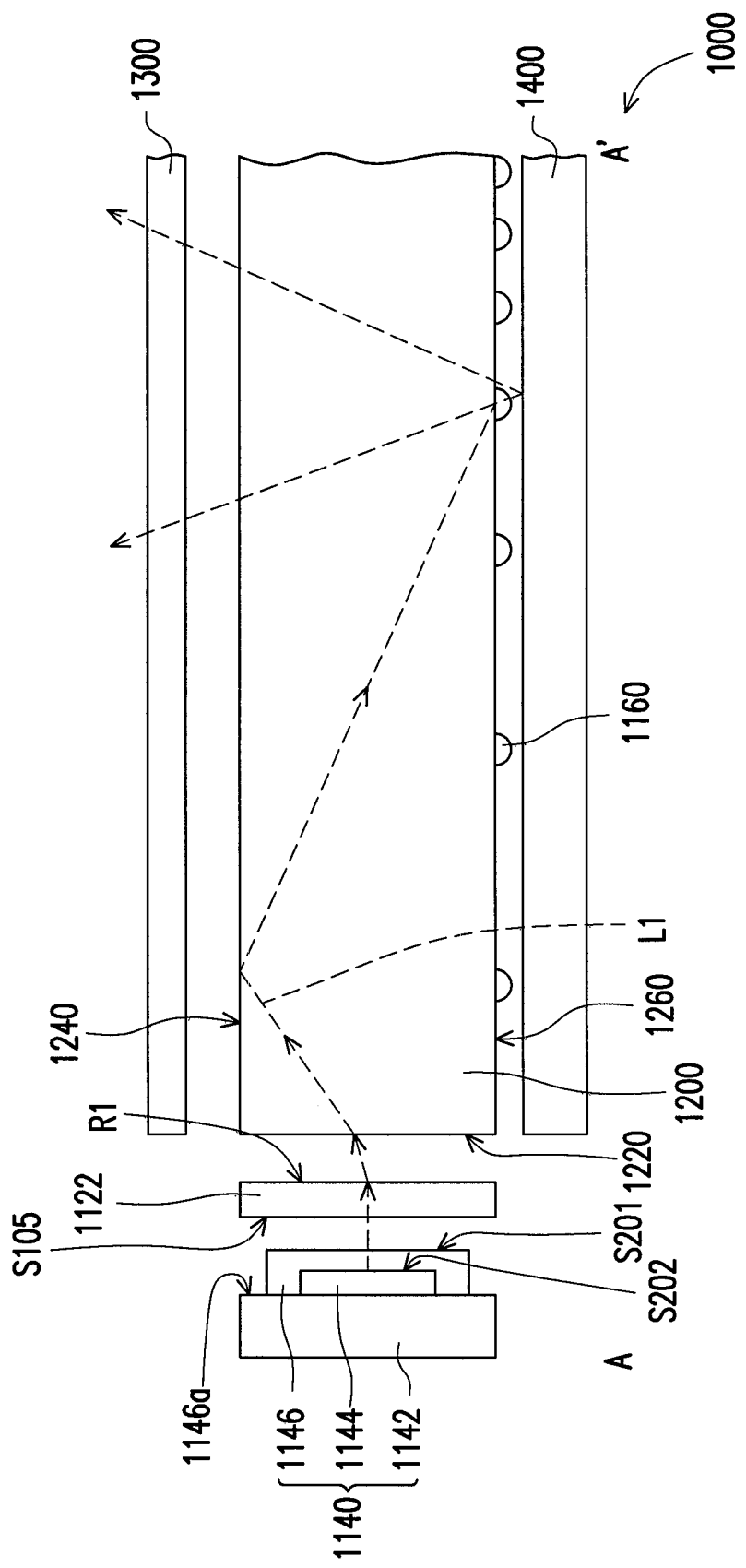
FIG. 1C is a locally sectional diagram of the illumination apparatus of FIG. 1A along line AA'.

FIG. 1A is a top-view diagram of an illumination apparatus according to an embodiment of the invention, FIG. 1B is a locally enlarged diagram of the illumination apparatus of FIG. 1A and FIG. 1C is a locally sectional diagram of the illumination apparatus of FIG. 1A along line AA'. Referring to FIGS. 1A, 1B, and 1C, an illumination apparatus 1000 of the embodiment includes a light source module 1100 and an LGP 1200. The light source module 1100 includes a transparent element 1120, a plurality of light-emitting devices 1140, and a plurality of light diffusion micro-structures 1160.

The transparent element 1120 includes a transparent substrate 1122, a plurality of first notches 1124, and a plurality of second notches 1126 as shown in FIGS. 1A, 1B, and 1C. In more details, the transparent substrate 1122 has a light exiting surface S101 and a bottom surface S103 opposite to the light exiting surface S101, wherein the first notches 1124 are sunken at the light exiting surface S101, and the first notches 1124 respectively have a reflection surface R1 therein. It should be noted that in FIG. 1B, although the light exiting surface S101 is marked at the transparent substrate 1122, but anyone skilled in the art should know the light exiting surface S101 extends to cover the whole upper surface of the transparent substrate 1122. Hence, in 'the first notches are sunken at the light exiting surface' or the similar expressions depicted by the patent specification or the claims, the light exiting surface implies the whole upper surface of the transparent substrate where the light exiting surface extends. In the embodiment, the reflection surface R1 connects the light exiting surface S101. Besides, the second notches 1126 are located respectively opposite to the first notches 1124 and sunken at the bottom surface S103, and the second notches 1126 respectively have a light incident curve-surface S105, wherein the light incident curve-surface S105 connects the bottom surface S103. In the same way, in FIG. 1B, although the bottom surface S103 is marked at the transparent substrate 1122, but anyone skilled in the art should know the bottom surface S103 extends to cover the whole lower surface of the transparent substrate 1122. Hence, in 'the second notches are sunken at the bottom surface' or the similar expressions depicted by the patent specification or the claims, the bottom surface implies the whole lower surface of the transparent substrate where the bottom surface extends. In the embodiment, the absolute values of the curve-surface's slopes of the light incident curve-surface S105 are descending along the direction from the places close to the bottom surface S103 to the places close to the light exiting surface S101.

The light-emitting devices 1140 are respectively disposed beside the light incident curve-surface S105 of each second notch 1126 and each of the light-emitting devices 1140 has a light exiting surface S201 being capable of providing a light beam L1, wherein the light exiting surface S201 of each the light-emitting device 1140 faces the light incident curve-surface S105 of each the corresponding second notch 1126, as shown by FIGS. 1A, 1B, and 1C. In particular, the light exiting surface S201 of each the light-emitting device 1140 in the embodiment is not conformed to the light incident curve-surface S105 of each the corresponding second notch 1126, i.e., the tangent slopes of the light exiting surface S201 of each the light-emitting device 140 are different from the tangent slopes of the corresponding light incident curve-surface S105 of the second notch 1126. In more details, the light-emitting device 1140 of the embodiment may include a substrate 1142, an LED chip 1144, and an encapsulant 1146. The LED chip 1144 is disposed on the substrate 1142 and has a light-emitting surface S202, and the light-emitting surface S202 is capable of providing the light beam L1. The encapsulant 1146 is disposed on the LED chip 1144 and a surface 1146a of the encapsulant 1146 includes the light-emitting surface S201 of each the light-emitting device 1140, wherein the surface 1146a of the encapsulant 1146 is exposed after the LED chip 1144 is packed by the encapsulant 1146 of the embodiment. The surface 1146a of the encapsulant 1146 therein is, for example, a plane surface.

In more details, the light exiting surface S201 of each the light-emitting device 1140 in the embodiment is not conformed to the light incident curve-surface S105 of each the corresponding second notch 1126. When the light beam L1 from the light exiting surface S201 is transmitted to the light incident curve-surface S105 of the transparent substrate 1122, a portion of the light beam L1 is obliquely incident on the light incident curve-surface S105. The partial light beam L1 passing through the light incident curve-surface S105 is refracted so that the light beam L1 may transmit more far in the transparent substrate 1122, which may reduce the probability for the partial light beam L1 to be directly transmitted to the light exiting surface of the transparent substrate and to exit out of the light exiting surface S101, and moreover, may relatively increase the probability for the partial light beam L1 to be transmitted in the transparent substrate 1122 so as to make the light intensity distribution in the transparent substrate 1122 more uniform.

When the partial light beam L1 after passing through the light incident curve-surface S105 is transmitted to the reflection surface R1, the light beam is at least partial total internal reflection (TIR) by the reflection surface R1. In more details, the reflection surface R1 of the embodiment is a TIR surface, wherein the difference between the refractive index of the transparent substrate 1122 and the refractive index of the ambient medium (for example, air) is larger, there is a more component of the light beam L1 from the light incident curve-surface S105 may be easier to TIR at the reflection surface R1. On the other hand, the inclination of the reflection surface R1 would affect the extent of reflecting the light beam L1 in the transparent substrate 1122. The amount reflected by the reflection surface R1 of the light beam L1 in the above-mentioned implementation may be adjusted according to requirement of a user. It should be noted that although a portion of the light beam L1 may be reflected by the reflection surface R1, however, if a minor amount of the light beam L1 at the reflection surface R1 has an incident angle less than the TIR angle (critical angle), the minor amount of the light beam L1 still may pass through the reflection surface R1 to exit out of the transparent substrate 1122.

In the embodiment, the transparent element 1120 may include a plurality of openings O1, wherein the openings O1 are respectively communicated with the first notches 1124 and the corresponding second notches 1126. The reflection surface R1 of each the first notch 1124 connects the light incident curve-surface S105 of the corresponding second notch 1126, as shown by FIGS. 1A, 1B, and 1C. In more details, due to the openings O1 of the transparent element 1120, a portion of the light beam L1 from the light exiting surfaces S201 of the light-emitting devices 1140 may directly pass through the openings O1 to exit out of the transparent element 1120.

The light diffusion micro-structures 1160 are disposed on the bottom surface S103 of the transparent element 1120, and the light source module 1100 may include a first reflective plate 1128, wherein the first reflective plate 1128 is disposed at bottom surface S103 of the transparent substrate 1122 and located at the peripheral of the light-emitting devices 1140, as shown by FIG. 1B. In the embodiment, the light diffusion micro-structures 1160 are, for example, a plurality of net points shown by FIG. 1B, for exemplary depiction, wherein the net points are arranged on the bottom surface S103 of the transparent element 1120 in varied intervals from sparse way to dense way along the direction away from the light-emitting device 1140, which the invention is not limited to.

In more details, after the light beam L1 enters the transparent element 1120 through the light incident curve-surface S105, the light diffusion micro-structures 1160 make a portion of the light beam L1 take incident angles less than the critical angle to be incident on the light exiting surface S101 of the transparent element 1120; therefore, the partial light beam L1 may pass through the light exiting surface S101 of the transparent element 1120 and exit out of the transparent element 1120. In addition in the embodiment, another part of the light beam L1 may be transmitted to the first reflective plate 1128 disposed on the bottom surface S103 of the transparent element 1120 by means of the scattering action of the light diffusion micro-structures 1160. The first reflective plate 1128 is capable of reflecting the light beam L1 to make the light beam L1 sequentially pass through the bottom surface S103 and the light exiting surface S101 of the transparent element 1120 to exit out of the transparent element 1120. In other words, the light source module 1100 of the embodiment may utilize the transparent element 1120 to convert the point light sources of the light-emitting devices 1140 into an uniform line light source for illumination or used as a backlight source.

In the illumination apparatus 1000, the LGP 1200 has a light incident surface 1220, a light exiting surface 1240, and a bottom surface 1260. The light exiting surface 1240 of the LGP 1200 is opposite to the bottom surface 1260 of the LGP 1200 and the light incident surface 1220 connects the light exiting surface 1240 of the LGP 1200 and the bottom surface 1260 of the LGP 1200. The light source module 1100 is disposed beside the light incident surface 1220 of the LGP 1200, and the light exiting surface S101 of the transparent substrate 1122 faces the light incident surface 1220 of the LGP 1200, as shown by FIGS. 1A, 1B, and 1C. In more details, since the illumination apparatus 1000 of the embodiment may use the transparent element 1120 in the light source module 1100 to convert the point light sources of the light-emitting devices 1140 into an uniform line light source before entering the LGP, so that the requirement of reducing the light-blending distance of an LGP in the prior art may be lightened and the hot spot phenomena of the LGP may be also decreased. In addition, the quantity of the employed light-emitting devices may be also reduced. In the embodiment, the LGP 1200 is, for example, a flat-type light guide plate, which the invention is not limited to. In the same way, in order to make the light beam more uniform to exit out of the light exiting surface of the LGP, the light diffusion micro-structures 1160 are also disposed on the bottom surface 1260 of the LGP 1200, as shown by FIG. 1C. The illumination apparatus 1000 also includes a second reflective plate 1400 disposed at the bottom surface 1260 of the LGP 1200, as shown by FIG. 1C.

Figure 2A:
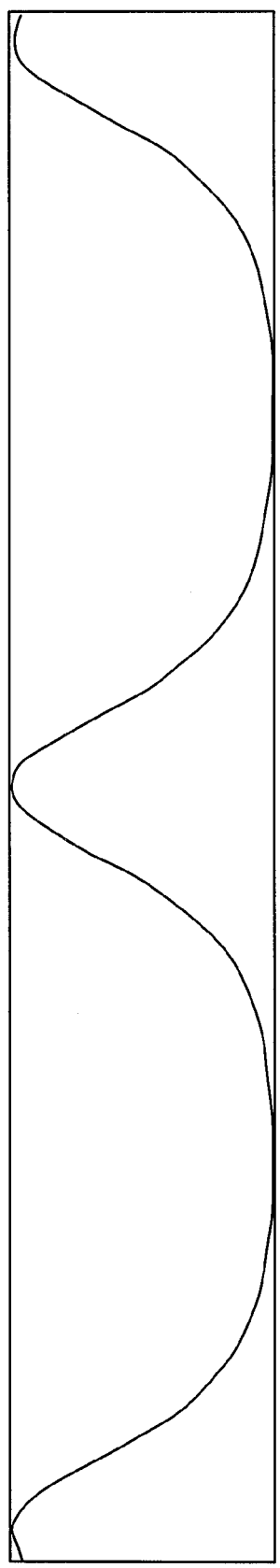
FIG. 2A is an intensity distribution graph of an optical field of an illumination apparatus provided by the embodiment without employing the transparent element.
Figure 2B:
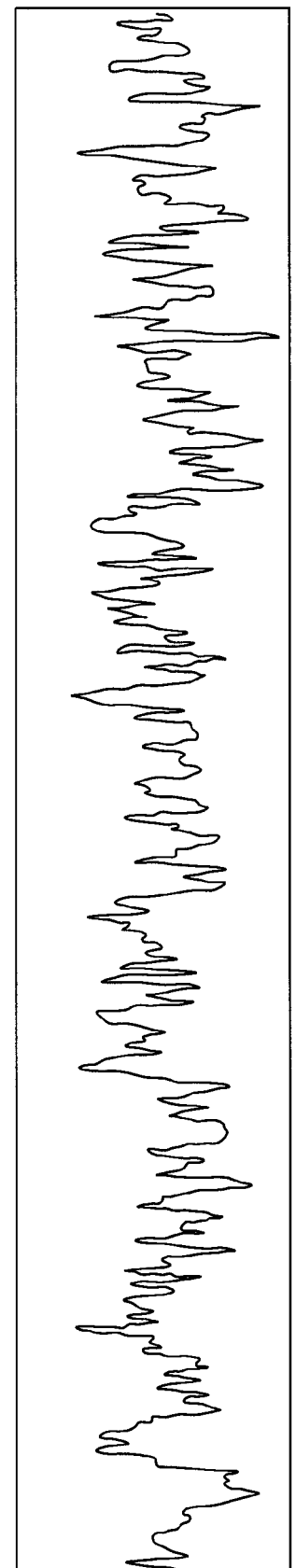
FIG. 2B is an intensity distribution graph of an optical field of an illumination apparatus provided by the embodiment with the employed transparent element.

FIG. 2A is an intensity distribution graph of an optical field of an illumination apparatus provided by the embodiment without employing the transparent element and FIG. 2B is an intensity distribution graph of an optical field of an illumination apparatus provided by the embodiment with the employed transparent element. In the embodiment, the intensity distributions of optical fields in the LGPs of FIGS. 2A and 2B are obtained by measuring the light intensity at the same distance from the light incident surfaces of the LGPs. In FIG. 2A, there are three noticeable bright peaks which indicate the light-emitting positions of the light-emitting devices, wherein the light uniformity of FIG. 2A is about below 1%, i.e., a noticeable hot spot phenomena is detected with the measuring distance when the illumination apparatus does not employ the transparent element. For example, the measuring condition of FIG. 2A is corresponding to 2.5 cm of the interval of the adjacent light-emitting devices. According to the above-mentioned requirement that the ratio (A/P) of the light-blending distance (A) over the interval between two adjacent light-emitting devices (P) is about 1.7, the corresponding light-blending distance of FIG. 2A should be 4.25 cm by the conversion calculation so as to have better light uniformity.

However, in the embodiment, the illumination apparatus 1000 employs the transparent element 1120 so that the point light sources of the light-emitting devices 1140 form a line light source and the light beam is able to be uniformly incident into the LGP 1200. As a result, under the same measuring condition as FIG. 2A, i.e., the intensity distribution of an optical field inside the LGP is measured at the same measuring position, the measured light uniformity as shown by FIG. 2B is about 75%. In more details, in FIG. 2B, the interval (P) between two adjacent light-emitting devices 1140 is also 2.5 cm, the light-blending distance (A) is 0.5 cm and the better measured light uniformity is given. In short, by means of employing and disposing the transparent element 1120 between the light-emitting devices 1140 and the LGP 1200, the illumination apparatus 1000 of the embodiment is advantageous in effectively reducing the hot spot phenomena and effectively reducing the ratio (A/P) of the light-blending distance (A) over the interval between two adjacent light-emitting devices (P). For example, it may be seen from FIG. 2B, the ratio A/P is 0.2 (A/P=0.5 cm/2.5 cm). Accordingly, the illumination apparatus 1000 of the embodiment is able to employ less quantity of the light-emitting devices and provide an illumination planar light source with better light uniformity.

In order to advance the light utilization efficiency, the transparent substrate 1122 may further have a side surface S102, wherein the side surface S102 connects the light exiting surfaces S101 and the bottom surface S103 of the transparent substrate 1122, as shown in FIG. 1A. In the embodiment, the side surface 5102 is inclined to the light exiting surfaces 5101 and the bottom surface 5103 of the transparent substrate 1122. In this way, when the partial light beam L1 in the transparent substrate 1122 is transmitted to the side surface 5102, the light beam L1 may be reflected by the side surface 5102 to exit out of the light exiting surfaces S101 of the transparent substrate 1122, wherein the reflection is based on a TIR or that a reflection layer is plated on the side surface S102 (not shown) so as to reflect the light beam L1 to the light exiting surfaces S101.

The light-radiation pattern and the light uniformity of the light beam L1 exiting out of the light exiting surface 1240 of the LGP 1200 may be further controlled. The illumination apparatus 1000 of the embodiment employs an optical film assembly 1300 on the light exiting surface 1240 of the LGP 1200 for the above-mentioned control purpose. In the embodiment, the optical film assembly 1300 includes at least one of diffusion sheet, prism sheet, and brightness-enhancing sheet. After the light beam L1 exits out of the light exiting surface 1240 of the LGP 1200, the light beam passes through the diffusion sheet and gets more uniform effect, while when the light beam L1 passes through the prism sheet and the brightness-enhancing sheet, the light exiting angle thereof is converged. In addition, in other embodiments, the optical films contained by the optical film assembly 1300 may be other optical films having appropriate micro-structures.

It should be noted that the transparent element 1120 used in the illumination apparatus 1000 in FIGS. 1A-1C may be a bar-like transparent element, i.e., the light source module 1100 may be seen as a line light source module. Accordingly, the first notches and the second notches in the illumination apparatus 1000 in FIGS. 1A-1C are arranged in the one-dimension. Since the illumination apparatus 1000 of the embodiment deploys optical devices such as the light source module 1100, the LGP 1200 and the optical film assembly 1300 and the like, the illumination apparatus 1000 may also serve, but not limited to, as a side-type backlight module. In fact, the illumination apparatus 1000 of the embodiment may also be used in regular illumination lighting apparatuses.

Figure 3:
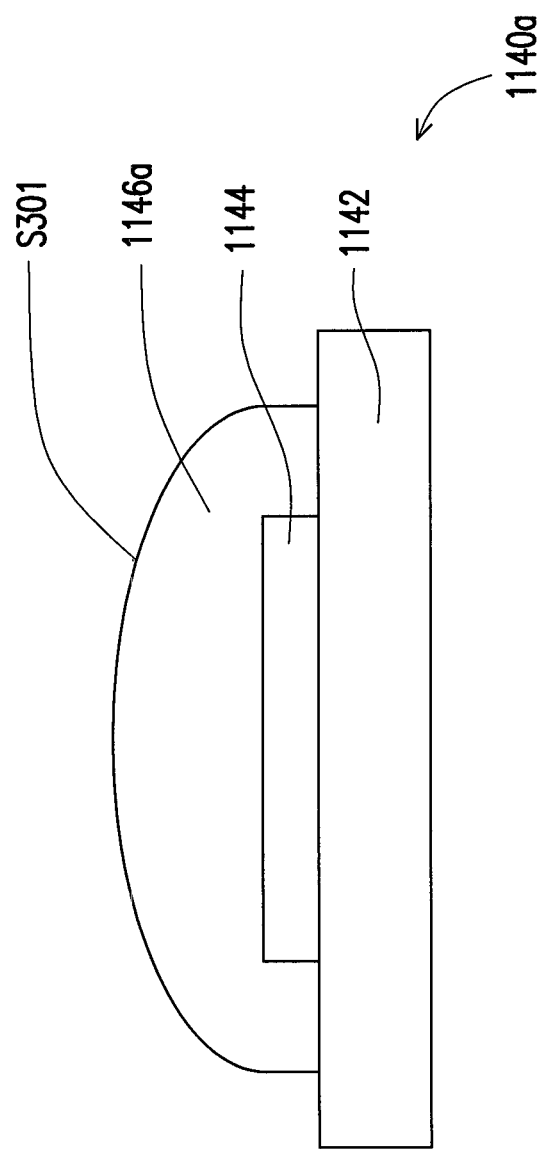
FIG. 3 is a diagram of another implementation of the light-emitting device of FIG. 1B.
Figure 4:
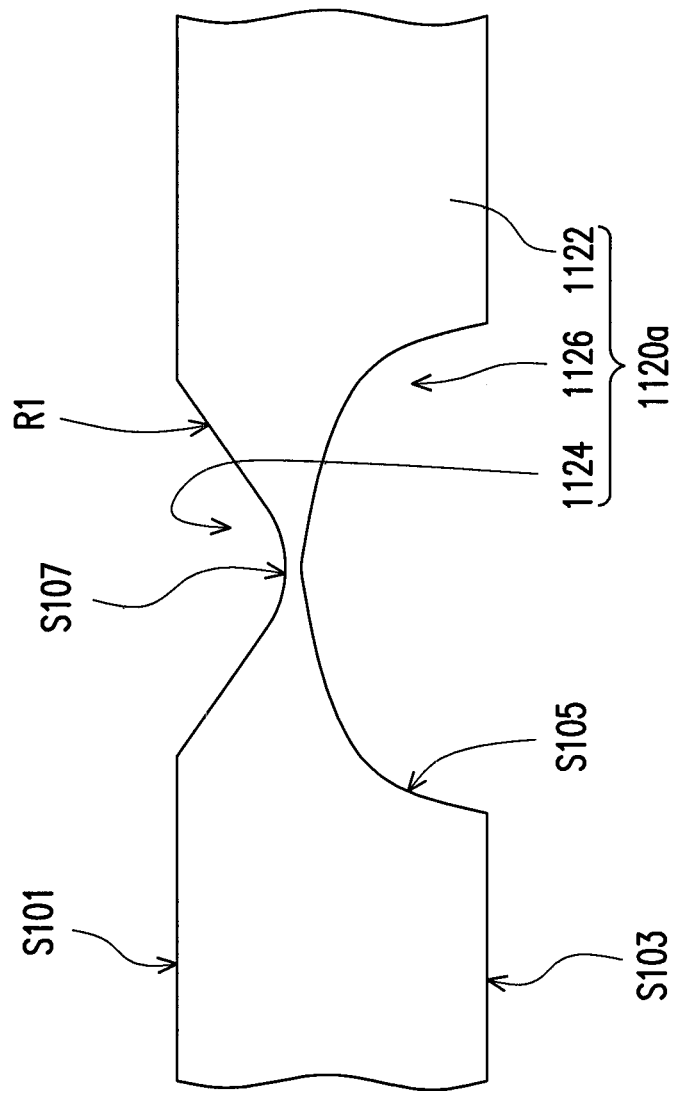
FIG. 4 is a diagram of another implementation of the transparent element of FIG. 1B.

FIG. 3 is a diagram of another implementation of the light-emitting device of FIG. 1B. Referring to FIGS. 1B and 3, in the illumination apparatus 1000, the light-emitting device 1140 may employ the implementation of the light-emitting device 1140a shown by FIG. 3. In more details, the light-emitting device 1140a is roughly the same as the light-emitting device 1140 except that a surface S301 of the encapsulant 1146a functions as the light exiting surface of the light-emitting device 1140a, wherein the surface S301 is a curve-surface. It should be noted that the curvature of the surface S301 is different from the curvature of the light incident curve-surface S105 of the illumination apparatus 1000. That is to say, the tangent slopes of the surface S301 are different from the tangent slopes of the corresponding light incident curve-surface S105, and the surface 5301 is not conformed to the light incident curve-surface S105, FIG. 4 is a diagram of another implementation of the transparent element of FIG. 1B. Referring to FIGS. 1B and 4, in the illumination apparatus 1000, the transparent element 1120 may employ the implementation of the transparent element 1120a shown by FIG. 4. In more details, the transparent element 1120a is roughly the same as the transparent element 1120 except that each of the first notches 1124 has a cavity bottom surface 5107 connecting the reflection surface R1. When the transparent element 1120a is used in the illumination apparatus 1000 of FIG. 1B, the partial light beam L1 from each the light-emitting device 1140 passes through the light incident curve-surface S105 of each the second notch 1126, enters the transparent substrate 1122, and passes through the cavity bottom surface S107 of each the first notch 1124 to exit out of the transparent substrate 1122.

Figure 5:
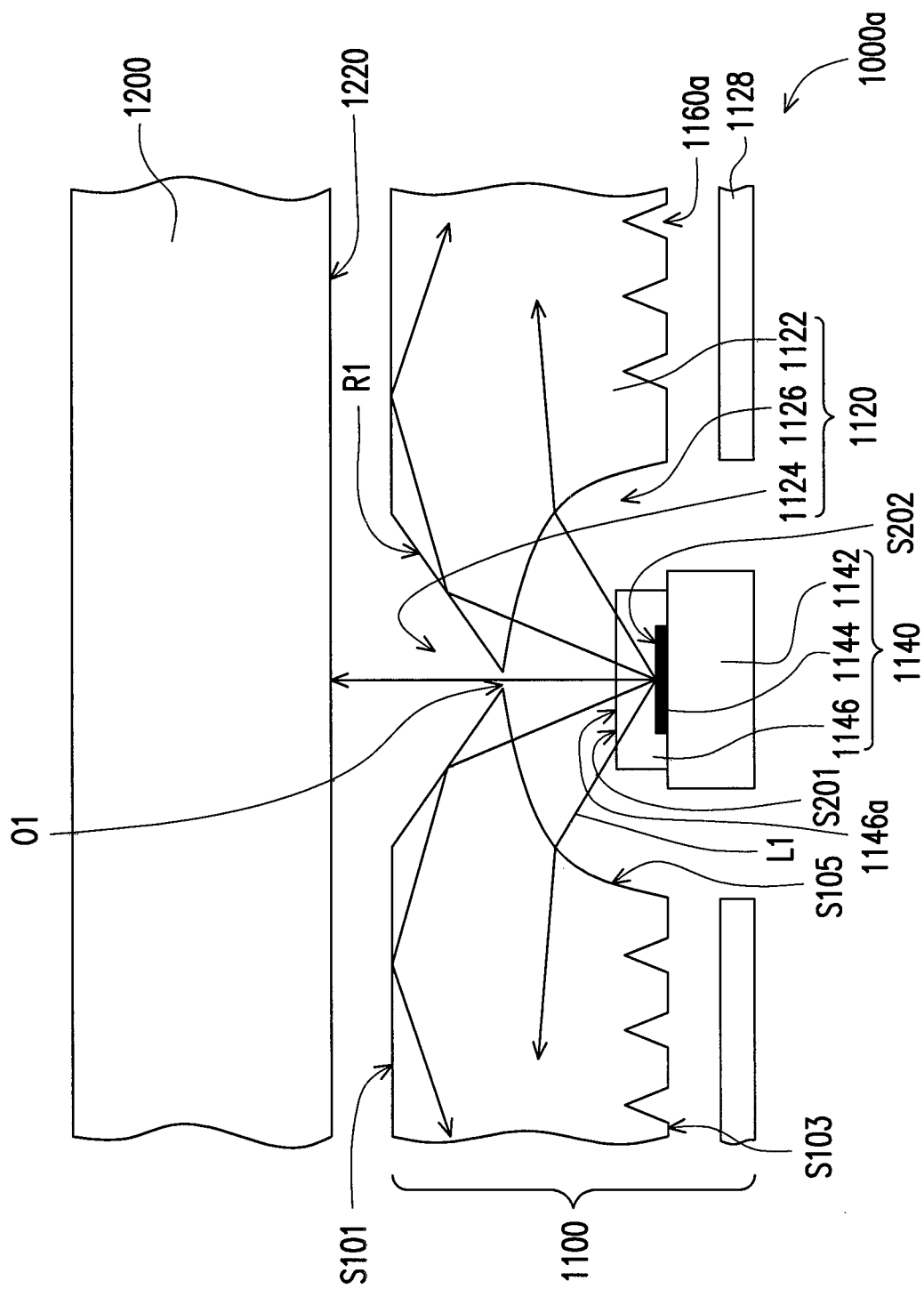
FIG. 5 is a diagram of another implementation of the illumination apparatus of FIG. 1B.

FIG. 5 is a diagram of another implementation of the illumination apparatus of FIG. 1B. Referring to FIGS. 1B and 5, the structure design idea of the illumination apparatus 1000a is the same as the illumination apparatus 1000, but the light diffusion micro-structures 1160a disposed on the bottom surface S103 of the transparent substrate 1122 are a plurality of sunken micro-structures shown by FIG. 5, wherein the sunken micro-structures function as the net points as well. That is to say, a portion of the light beam L1 exits out of the light exiting surfaces S101 of the transparent substrate 1122, while another part of the light beam L1 would passes through the sunken micro-structures to exit out of the bottom surface S103, be transmitted to the first reflective plate 1128, then be reflected by the first reflective plate 1128 again to be transmitted back into the transparent substrate 1122, and finally exit out of the light exiting surface S101. Since the illumination apparatus 1000a has the same design idea as the illumination apparatus 1000, the illumination apparatus 1000a has the same advantage of the illumination apparatus 1000.

Figure 6A:
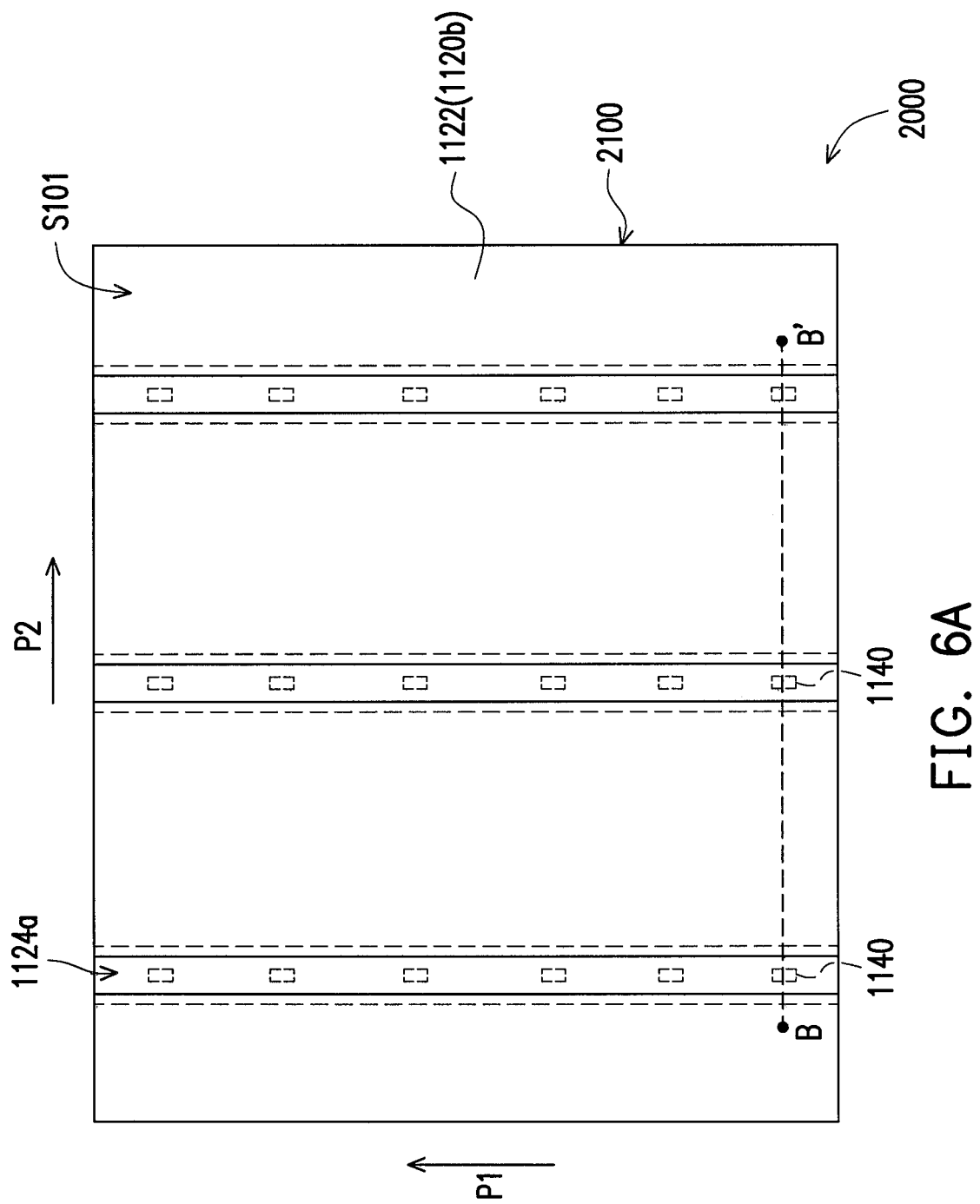
FIG. 6A is a top-view diagram of an illumination apparatus according to another embodiment of the invention.
Figure 6B:
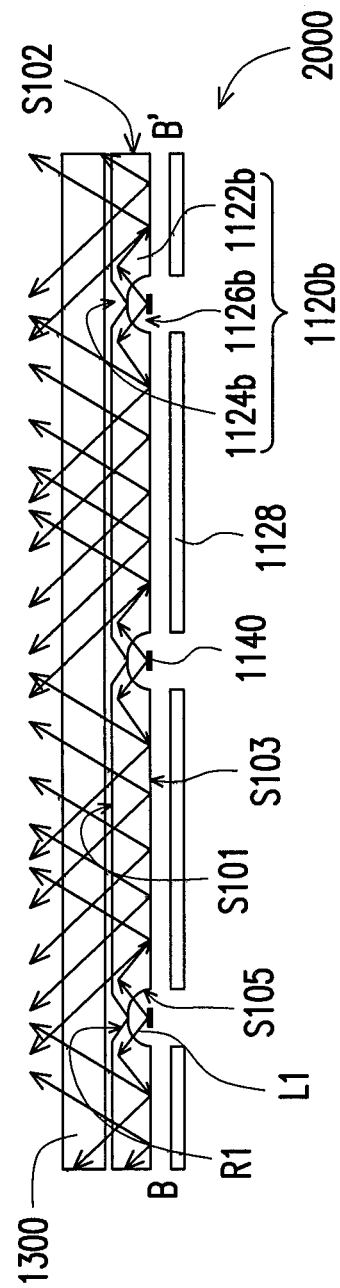
FIG. 6B is a locally sectional diagram of the illumination apparatus of FIG. 6A along line BB'.

FIG. 6A is a top-view diagram of an illumination apparatus according to another embodiment of the invention and FIG. 6B is a locally sectional diagram of the illumination apparatus of FIG. 6A along line BB'. Referring to FIGS. 1A-1C, 6A, and 6B, the illumination apparatus 2000 of the embodiment is similar to the illumination apparatus 1000 except that the transparent element 1120b therein is a flat-type transparent element, and the first notches 1124b and the second notches 1126b are arranged in the two-dimensions on the transparent substrate 1122b, as shown in FIG. 6A. In more details, each of the first notches 1124b and each of the second notches 1126b extend along a first direction P1 and are arranged along a second direction P2, as shown in FIG. 6A. Each of the light-emitting devices 1140 is disposed under each the corresponding second notch 1126b. In other words, the light source module 2100 of the embodiment combines the light-emitting devices 1140 with a plurality of point light sources with the transparent element 1120b, so that the light source module 2100 is able to provide a planar light source. In this way, the illumination apparatus 2000 may be used not only as an illumination lighting apparatus, but also as a direct-type backlight module when the illumination apparatus 2000 is associated with the optical film assembly 1300. In the embodiment, the side surface S102 may be perpendicular to the light exiting surface S101 and the bottom surface S103 of the transparent substrate 1122.

Since the illumination apparatus 2000 is designed by the similar structure idea to the illumination apparatus 1000, the illumination apparatus 2000 has the same advantage of the illumination apparatus 1000, which is omitted to describe.

Figure 7A:
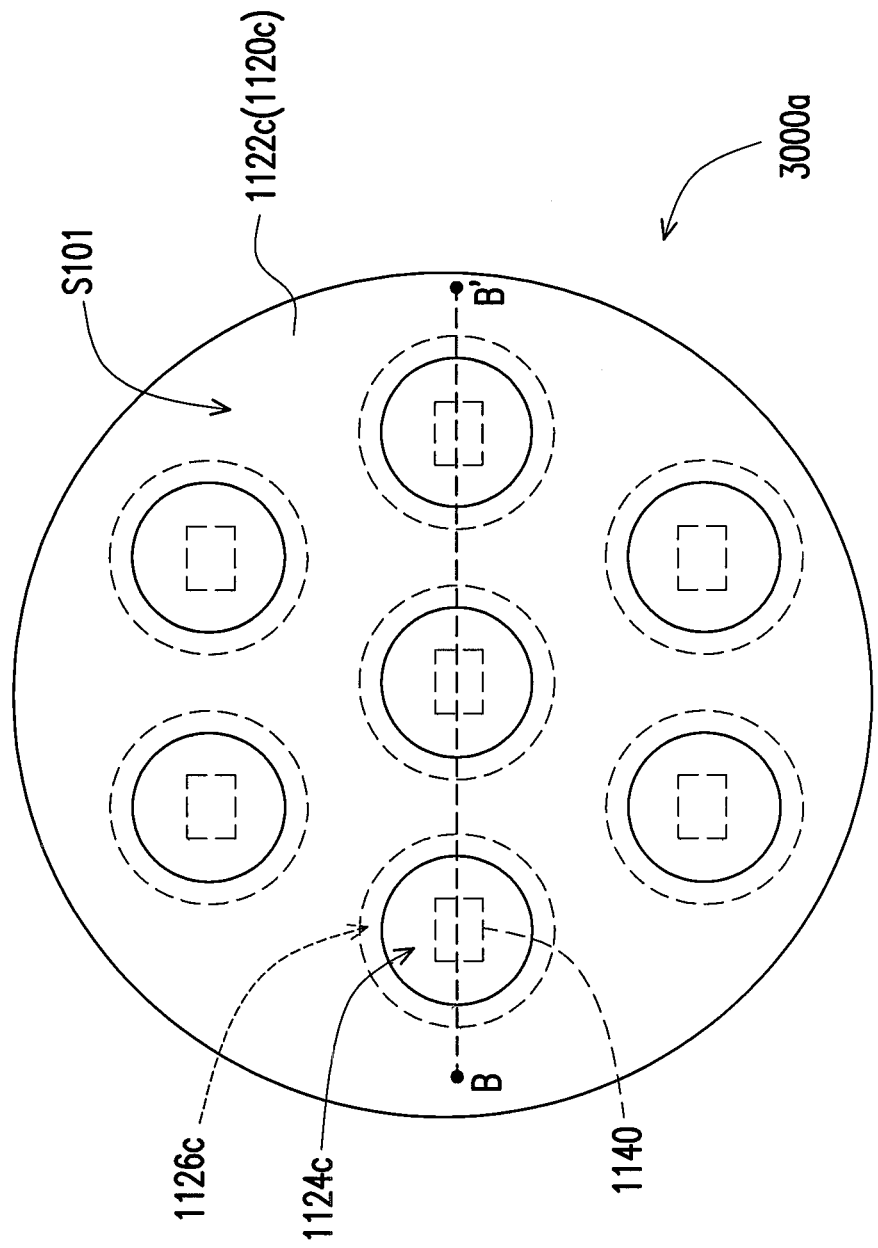
FIG. 7A is a top-view diagram of an illumination apparatus according to yet another embodiment of the invention.

FIG. 7A is a top-view diagram of an illumination apparatus according to yet another embodiment of the invention. Referring to FIGS. 6A, 6B, and 7A, the structure design idea of the illumination apparatus 3000a of the embodiment is similar to the illumination apparatus 2000 except that the outline of the light exiting surface S101 of the flat-type transparent element 1120c is a circle, and the first notches 1124c and the second notches 1126c are arranged in the two-dimensions on the flat-type transparent substrate 1122c, as shown in FIG. 7A. In more details, each of the first notches 1124c and each the corresponding second notches 1126c are arranged in spots, which is different from FIG. 6A where each of the first notches 1124b and each the corresponding second notches 1126b are arranged in bars. In the same way, each of the light-emitting devices 1140 is disposed under each the corresponding second notch 1126c. Since the illumination apparatus 3000a is designed by the same structure idea as the illumination apparatus 2000, the illumination apparatus 3000a has the same advantage of the illumination apparatus 2000, which is omitted to describe.

Figure 7B:
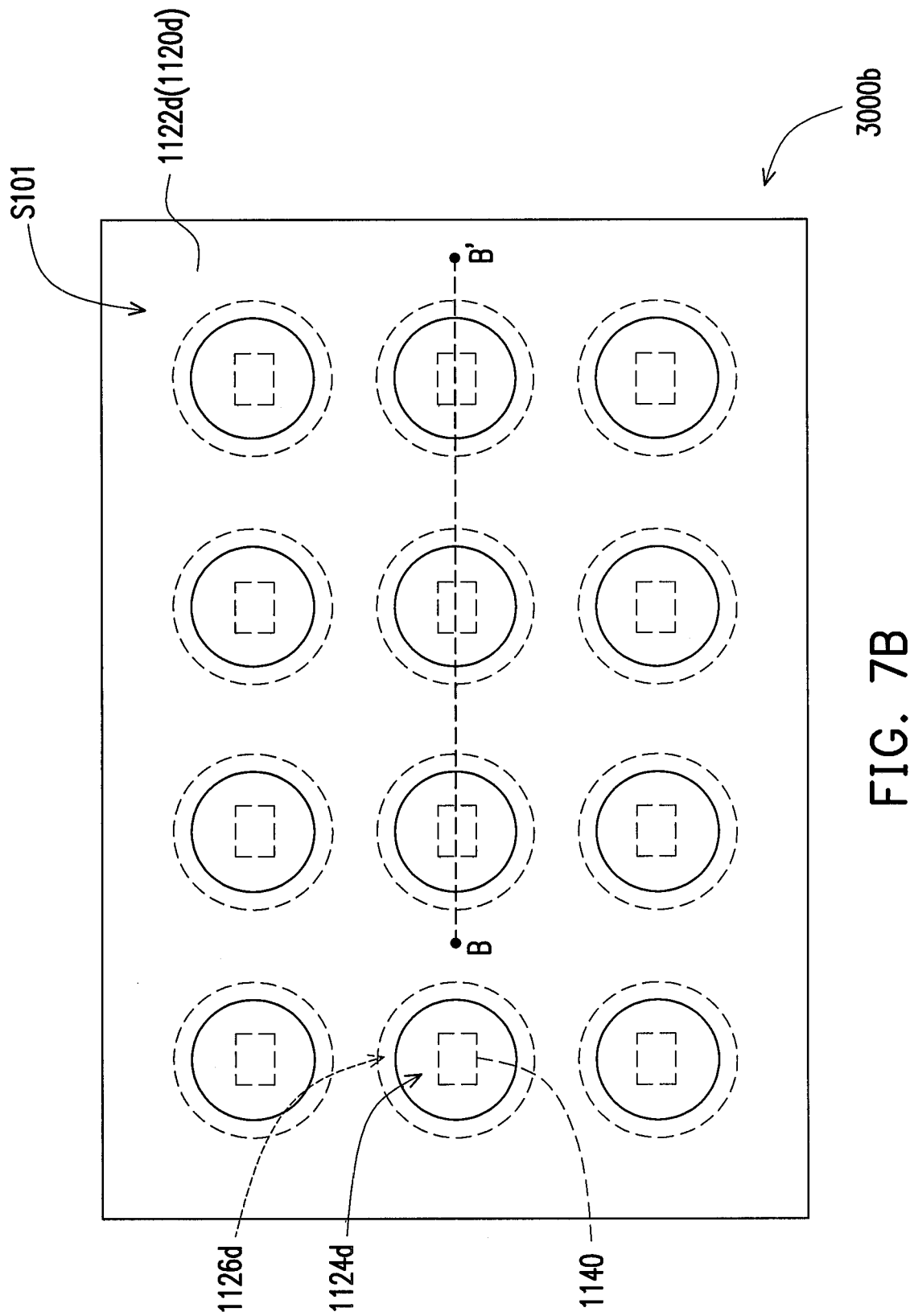
FIG. 7B is a top-view diagram of an illumination apparatus according to yet another embodiment of the invention.

FIG. 7B is a top-view diagram of an illumination apparatus according to yet another embodiment of the invention. Referring to FIGS. 7A and 7B, the structure design idea of the illumination apparatus 3000b of the embodiment is similar to the illumination apparatus 3000a except that the outline of the light exiting surface S101 of the flat-type transparent element 1120d is a square, as shown in FIG. 7B. Each of the first notches 1124d and each the corresponding second notch 1126d are arranged in spots, which is different from FIG. 6A where each of the first notches 1124b and each the corresponding second notch 1126b are arranged in bars. In addition, each of the light-emitting devices 1140 is disposed under each the corresponding second notch 1126d. Since the illumination apparatus 3000b is designed by the same structure idea as the illumination apparatus 3000a, the illumination apparatus 3000b has the same advantage of the illumination apparatus 3000a, which is omitted to describe.

In summary, the light source module and the illumination apparatus of the embodiment of the invention have at least following advantages. The light source module combines the light-emitting devices with a plurality of point light sources with the transparent element, wherein the light exiting surface of the light-emitting device is not conformed to the light incident curve-surface of the transparent element, so that a line light source or a planar light source with better light uniformity may be provided. In addition, in the illumination apparatus, if the LGP is combined with the light source module providing a line light source, the light source module is advantageous in not only reducing the quantity of the employed light-emitting devices, but also reducing the hot spot phenomena, so that an illumination planar light source with better light uniformity may be provided. Besides, in the illumination apparatus, if the optical film assembly is combined with the light source module providing a planar light source, the quantity of the employed light-emitting devices may be also reduced and an illumination planar light source with better light uniformity may be provided as well.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention," "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first," "second," etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, comprising:
    a transparent element, comprising:
        a transparent substrate, having a light exiting surface and a bottom surface opposite to the light exiting surface;
        a plurality of first notches, sunken at the light exiting surface and respectively having a reflection surface therein, wherein the reflection surface connects the light exiting surface;
        a plurality of second notches, respectively opposite to the first notches and sunken at the bottom surface, wherein the second notches respectively have a light incident curve-surface, and the light incident curve-surface connects the bottom surface; and
        a plurality of openings, wherein the openings are respectively communicated with the first notches and the corresponding second notches;
    a plurality of light-emitting devices, respectively disposed beside the light incident curve-surface of each of the second notches, wherein each of the light-emitting devices has a light exiting surface capable of providing a light beam, the light exiting surface of each the light-emitting device is not conformed respectively to the light incident curve-surface of each the corresponding second notch; and
    a plurality of light diffusion micro-structures, disposed on the bottom surface of the transparent substrate.

2. The light source module as claimed in claim 1, wherein the light beam from each of the light-emitting devices is capable of passing through the light incident curve-surface of each of the second notches to enter the transparent substrate, and a portion of the light beam passing through the light incident curve-surface is transmitted to the reflection surface and at least partial of a portion of the light beam is total internal reflected by the reflection surface.

3. The light source module as claimed in claim 1, wherein each of the light-emitting devices comprises a substrate, a light emitting diode chip, and an encapsulant, wherein the light emitting diode chip is disposed on the substrate and has a light-emitting surface, the light-emitting surface is capable of providing the light beam, the encapsulant is disposed on the light emitting diode chip, and a surface of the encapsulant comprises the light exiting surface of the corresponding light-emitting device.

4. The light source module as claimed in claim 3, wherein the surface of the encapsulant comprises a plane surface or a curve-surface.

5. The light source module as claimed in claim 1, wherein the reflection surface connects the light incident curve-surface.

6. The light source module as claimed in claim 1, wherein the transparent substrate further has a side surface, and the side surface connects the light exiting surface and the bottom surface of the transparent substrate.

7. The light source module as claimed in claim 6, wherein the side surface is perpendicular to the light exiting surface and the bottom surface of the transparent substrate.

8. The light source module as claimed in claim 6, wherein the side surface is inclined to the light exiting surface and the bottom surface of the transparent substrate, and when the partial light beam in the transparent substrate is transmitted to the side surface, the light beam is reflected by the side surface to exit out of the light exiting surface of the transparent substrate.

9. The light source module as claimed in claim 1, wherein the light diffusion micro-structures comprise a plurality of net points or a plurality of sunken micro-structures.

10. The light source module as claimed in claim 1, further comprising a first reflective plate disposed at the bottom surface of the transparent substrate and located at the peripherals of the light-emitting devices.

11. An illumination apparatus, comprising:
a light source module as claimed in claim 1; and
a light guide plate, having a light incident surface, a light exiting surface, and a bottom surface, wherein the light exiting surface of the light guide plate is opposite to the bottom surface of the light guide plate, the light incident surface connects the light exiting surface of the light guide plate and the bottom surface of the light guide plate, the light source module is disposed beside the light incident surface of the light guide plate and the light exiting surface of the transparent substrate faces the light incident surface of the light guide plate.

12. The illumination apparatus as claimed in claim 11, further comprising an optical film assembly disposed on the light exiting surface of the light guide plate, wherein the optical film assembly comprises at least one of diffusion sheet, prism sheet, and brightness-enhancing sheet.

13. The illumination apparatus as claimed in claim 11, further comprising a second reflective plate disposed at the bottom surface of the light guide plate.

14. The illumination apparatus as claimed in claim 11, wherein the transparent element is a bar-like transparent substrate.

15. The illumination apparatus as claimed in claim 11, wherein the first notches and the second notches are arranged in the one-dimension.

16. An illumination apparatus, comprising:
a light source module as claimed in claim 1; and
an optical film assembly disposed on the light exiting surface of the transparent substrate, wherein the optical film assembly comprises at least one of diffusion sheet, prism sheet, and brightness-enhancing sheet.

17. The illumination apparatus as claimed in claim 16, wherein the transparent element is a flat-type transparent element.

18. The illumination apparatus as claimed in claim 16, wherein the first notches and the second notches are arranged in the two-dimensions on the transparent substrate.

* * * * *